(12) United States Patent
Klim et al.

(10) Patent No.: US 10,549,848 B2
(45) Date of Patent: Feb. 4, 2020

(54) DEPLOYABLE AND RETRACTABLE SHOCK STRUT

(71) Applicant: Safran Landing Systems Canada Inc., Ajax (CA)

(72) Inventors: Graeme Peter Arthur Klim, Beamsville (CA); Steven Kevin Amberg, Toronto (CA); Clément Rodrigues De Souza Meireles, Cheltenham (GB); Min Prasad Adhikari, Toronto (CA); Mohammad Moeid Elahikahouker, Toronto (CA); Seyed Mohammad Hashemi, Waterloo (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 296 days.

(21) Appl. No.: 15/498,028

(22) Filed: Apr. 26, 2017

(65) Prior Publication Data
US 2018/0312245 A1    Nov. 1, 2018

(51) Int. Cl.
| | |
|---|---|
| B64C 25/60 | (2006.01) |
| F16F 9/06 | (2006.01) |
| F16F 9/56 | (2006.01) |
| B61B 13/10 | (2006.01) |
| B61F 13/00 | (2006.01) |

(52) U.S. Cl.
CPC ............. *B64C 25/60* (2013.01); *F16F 9/061* (2013.01); *F16F 9/56* (2013.01); *B61B 13/10* (2013.01); *B61F 13/00* (2013.01); *F16F 2232/08* (2013.01); *F16F 2236/04* (2013.01)

(58) Field of Classification Search
CPC ... B64C 25/60; F16F 9/061; F16F 9/56; F16F 2232/08; F16F 2236/04; B61F 13/10; B61F 13/00
See application file for complete search history.

(56) References Cited

U.S. PATENT DOCUMENTS 2,159,058 A * 5/1939 Taylor .................. B64C 35/008
                                                                   244/101
2,569,542 A * 10/1951 Terdina .................. B64C 25/24
                                                                   192/223

(Continued)

OTHER PUBLICATIONS

Extended European Search Report dated Jul. 3, 2018, issued in corresponding European Application No. 18169168.4, filed Apr. 25, 2018, 7 pages.

*Primary Examiner* — Michelle Clement
(74) *Attorney, Agent, or Firm* — Christensen O'Connor Johnson Kindness PLLC (57) ABSTRACT

A shock strut for a vehicle includes a housing with a through channel and a motor mount, and a motor fixed to the housing. The cylinder of a shock strut is configured to define a lead screw on its outer surface. The cylinder extends through the housing. The piston of the shock strut is attached to a ground engaging assembly. A gear nut rotatably mounted in the housing threadably engages the threaded cylinder, and is configured to be driven by the motor. The housing is attached to the vehicle, and the gear nut is controllably rotated to extend and retract the shock strut. A sensor provided on the assembly monitors the position of the shock strut. A torsion link assembly reacts rotational forces on the cylinder.

20 Claims, 4 Drawing Sheets

(56) References Cited

U.S. PATENT DOCUMENTS

| | | | | |
|---|---|---|---|---|
| 2,660,028 | A * | 11/1953 | Geyer | F15B 13/10 60/709 |
| 2,667,953 | A * | 2/1954 | Griswold | B64C 25/20 192/13 R |
| 2,692,661 | A * | 10/1954 | Bertsch | F41A 25/10 188/129 |
| 2,933,271 | A | 4/1960 | Maltby | |
| 3,826,450 | A * | 7/1974 | Currey | B64C 25/001 244/103 R |
| 3,895,682 | A | 7/1975 | Graham | |
| 3,921,958 | A | 11/1975 | Brockelsby et al. | |
| 3,954,232 | A * | 5/1976 | Harper | B64C 25/001 244/102 R |
| 4,637,272 | A * | 1/1987 | Teske | F16H 25/205 74/89.26 |
| 4,745,815 | A * | 5/1988 | Klopfenstein | B64C 13/38 74/89.25 |
| 5,085,412 | A * | 2/1992 | Peterson | B64C 25/60 188/269 |
| 5,092,539 | A * | 3/1992 | Caero | B64C 27/28 244/99.9 |
| 5,144,851 | A * | 9/1992 | Grimm | B64C 13/36 74/89.26 |
| 5,214,972 | A * | 6/1993 | Larson | F16H 25/205 74/89.26 |
| 5,310,140 | A | 5/1994 | Veaux et al. | |
| 5,547,148 | A * | 8/1996 | Del Monte | B64C 25/60 188/376 |
| 5,908,174 | A | 6/1999 | Churchill et al. | |
| 6,328,259 | B1 * | 12/2001 | Bolukbasi | B64C 25/60 188/371 |
| 6,791,215 | B2 * | 9/2004 | Tesar | F16H 25/205 310/12.24 |
| 7,802,488 | B2 * | 9/2010 | Bucheton | F16H 25/205 74/89.23 |
| 7,942,366 | B2 | 5/2011 | Waide | |
| 8,042,765 | B1 * | 10/2011 | Nance | B64C 25/00 244/100 R |
| 8,070,094 | B2 * | 12/2011 | Collins | B64C 25/12 244/102 A |
| 8,314,518 | B2 * | 11/2012 | Hors | F16H 25/20 310/12.14 |
| 8,556,209 | B2 | 10/2013 | Luce | |
| 8,565,968 | B2 * | 10/2013 | Nance | G01M 17/04 244/100 R |
| 8,727,273 | B2 | 5/2014 | Luce | |
| 9,765,867 | B2 * | 9/2017 | Hirai | F16H 25/205 |
| 2004/0195442 | A1 * | 10/2004 | Yoshioka | B64C 25/001 244/104 CS |
| 2007/0164151 | A1 | 7/2007 | Luce | |
| 2009/0242692 | A1 * | 10/2009 | Hadley | B64C 25/50 244/50 |
| 2013/0341457 | A1 * | 12/2013 | Wilson | B64C 25/14 244/17.17 |
| 2015/0166195 | A1 * | 6/2015 | Wilson | B64C 25/58 244/100 R |

* cited by examiner

DEPLOYABLE AND RETRACTABLE SHOCK STRUT

BACKGROUND

Deployable shock-absorbing vehicle struts, or shock struts, for example oleo struts, are used for vehicles such as aircraft and hyperloop pod vehicles. An oleo strut (oleo-pneumatic shock absorbing strut) converts kinetic energy into heat by the use of a gas, providing elastic spring characteristics, and oil for dampening. In aircraft, the oleo strut cushions landing impacts or bump perturbations and dampens repeat oscillations as well as the tendency for an aircraft to rebound or "bounce." The oleo strut may be mixed or separated, and single-stage or multiple-stage, for example. Other types of shock struts exist, but are not commonly used in the current state of the art. See Currey, Norman S., Aircraft Landing Gear Design: Principles and Practices (1988). For example, an oleo strut for landing gear is disclosed in U.S. Pat. No. 2,279,447 to Cowey, which is hereby incorporated by reference in its entirety.

Aircraft, helicopters, hyperloop vehicles and the like, typically have very limited space for stowing deployable wheel systems and/or landing gear, and positioning deployable wheel systems to engage available space in the aircraft or other vehicle can be challenging.

Prior art systems that address this problem are directed to mechanisms that allow the landing gear shock strut to be compressed, or shortened, prior to stowing the landing gear. The shock strut is then extended after the landing gear is moved out of the stowage volume of the aircraft and prior to landing. Landing gear struts that are configured to shorten the shock absorber for stowage are sometimes referred to as shrink shock struts. For example, in U.S. Pat. No. 5,908,174 to Churchill et al., which is hereby incorporated by reference, an automatic shrink shock strut for an aircraft landing gear is disclosed that is configured to selectively retract the strut shock piston into the cylinder by transferring pressurized hydraulic fluid into a shrink chamber, and to re-expand the shock absorber prior to landing by transferring pressurized gas into a gas spring chamber to force hydraulic fluid out of the shrink chamber.

In U.S. Pat. No. 7,942,366 to Waide, a shock strut is disclosed having a shock absorber with a dedicated center channel defined in the cylinder of the shock absorber, and a coaxial motor configured to drive a nut rotatably attached at the top end of the cylinder. A lead screw engages the nut, such that the length of the strut can be modified by adjusting the portion of the lead screw that is in the center channel. In another embodiment, the motor is mounted at the top of the lead screw and configured to drive the lead screw. However, in either case, the middle portion of the shock absorber is not available to provide the desired shock absorbing and energy dissipation, and would therefore diminish the functionality of the shock strut.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A shock absorbing strut includes a housing that is configured to be pivotably mounted to a vehicle, such as an aircraft or a hyperloop pod. The housing has a through channel and a motor mount. A motor is fixed to the motor mount and configured to controllably drive a shaft and a pinion gear mounted on the shaft. A shock absorber includes a cylinder with an external screw thread that extends through the housing through channel, and a piston that pivotably connects to a ground engaging assembly. A geared nut threadably engages the cylinder screw thread and has a peripheral gear portion that is driveably engaged by the pinion gear. Upper and lower bearing assemblies rotatably support the geared nut in the housing. The motor is configured to rotate the geared nut such that the cylinder moves axially with respect to the housing, thereby extending or retracting the shock absorbing strut.

In an embodiment the housing is pivotably mounted to the vehicle with a pair of oppositely disposed trunnion pins.

In an embodiment the motor is an electric motor, for example a brushless DC motor, and includes a connection member, for example wires or a wireless transceiver, for receiving and transmitting control signals to and from the motor.

In an embodiment, the control strut includes a sensor configured to detect an extension positon of the shock strut, and to provide sensor data to a controller. For example, the sensor may be configured to monitor the number of rotations of the geared nut.

In an embodiment the ground engaging assembly includes a trailing arm assembly having a first mounting portion that pivotably connects to the piston, and a second mounting portion having a pivot pin spaced apart from the first mounting portion. In an embodiment an axle is rotatably mounted in the first mounting portion of the trailing arm assembly.

In an embodiment a torsion link assembly is provided connecting the piston to the cylinder such that the piston can move axially with respect to the cylinder, but is prevented from moving rotationally with respect to the cylinder.

In an embodiment the shock absorbing strut is a portion of a landing gear for an aircraft.

In an embodiment the screw thread is a trapezoidal thread, for example an Acme thread.

In an embodiment the first and second bearing assemblies are single row deep groove ball bearing assemblies.

A method of extending and retracting a shock absorbing strut mounted to a vehicle, comprises providing a housing defining a through channel and including a motor mount attached to the vehicle, a shock absorber comprising a piston pivotably connected to a ground engaging assembly, and a cylinder that slidably receives the piston, an outer surface of the cylinder having a screw thread, wherein the cylinder extends through the housing through channel, a geared nut having a central aperture that threadably engages the cylinder screw thread and a peripheral gear portion, and a motor fixed to the motor mount and configured to drive a pinion gear that engages the peripheral gear portion of the geared nut. The method includes sensing the location of the cylinder within respect to the housing and using the motor and the sensed location data to controllably drive the pinion gear such that the geared nut rotates about the cylinder to cause the shock absorber to moves axially with respect to the geared nut.

In an embodiment the housing is pivotably mounted to the vehicle with a pair of oppositely disposed trunnion pins.

In an embodiment the motor is an electric motor, and further comprises a connection member for receiving and transmitting control signals to and from the motor.

In an embodiment the ground engaging assembly comprises a trailing arm assembly having a first mounting portion that pivotably connects to the piston, and a second mounting portion comprising a pivot pin spaced apart from the first mounting portion.

In an embodiment the ground engaging assembly further comprises an axle rotatably mounted in the trailing arm assembly, and a plurality of wheels mounted on the axle.

In an embodiment a torsion link assembly is provided connecting the piston to the cylinder such that the piston can move axially with respect to the cylinder but is prevented from moving rotationally with respect to the cylinder.

In an embodiment the shock absorbing strut comprises a portion of a landing gear for an aircraft.

In an embodiment the screw thread is a trapezoidal thread.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
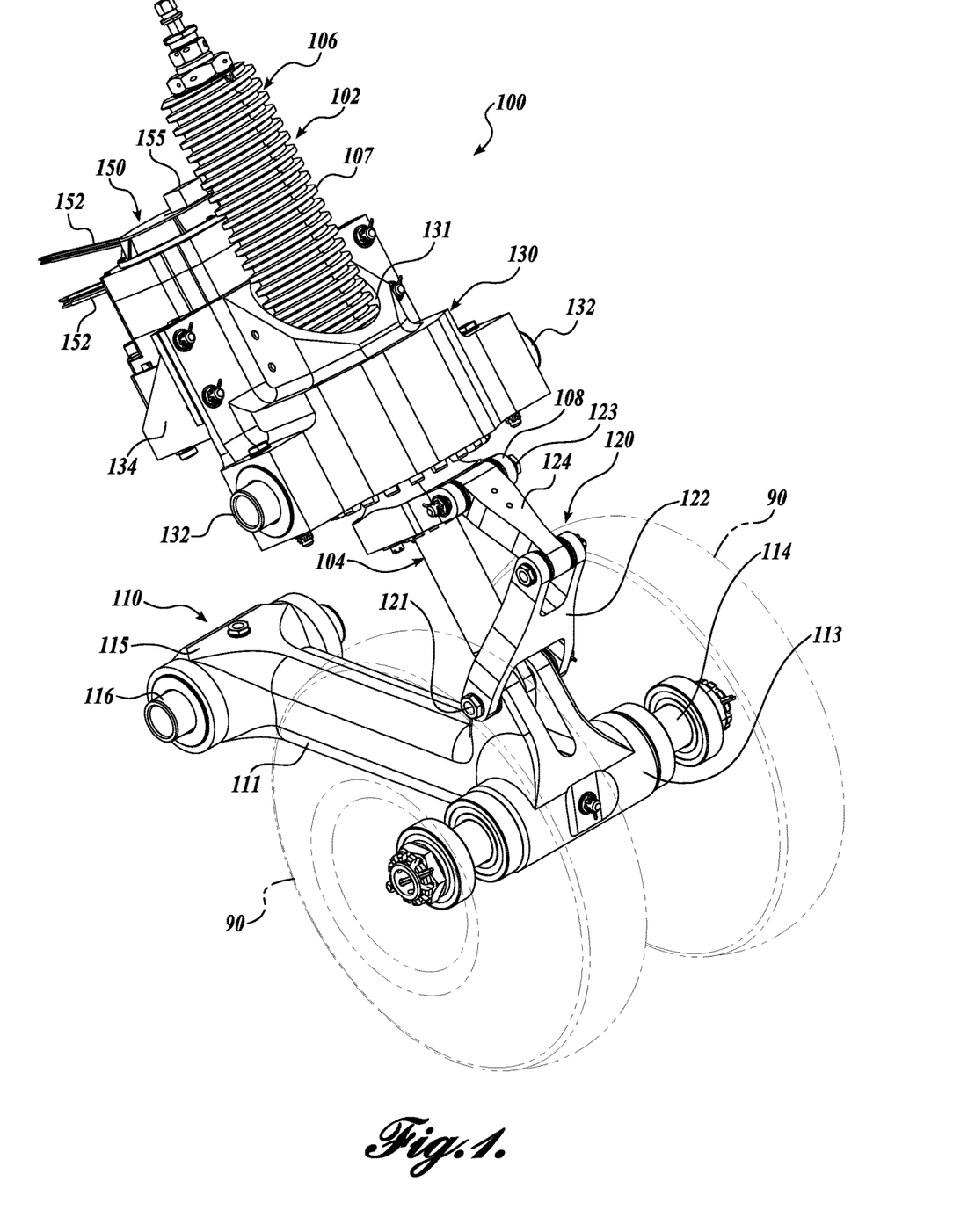
FIG. 1 is a perspective view of a deployable shock strut assembly in accordance with the present invention, with mountable wheels shown in phantom.

A perspective view of a deployable shock strut assembly 100 for a vehicle in accordance with the present invention is shown in FIG. 1. In some embodiments, the deployable shock strut assembly 100 provides a portion of landing gear assembly for an airplane or helicopter, or a ground support for a hyperloop pod.

The shock strut assembly 100 includes a shock absorber 102 having a piston 104 that telescopically engages a cylinder 106. The shock absorber 102 is configured to cushion impacts (for example during landings) in a conventional manner, typically compressing a gas (for example nitrogen or dry air) contained in the shock strut assembly 100 and dissipating the compression energy by performing work on an incompressible fluid (for example hydraulic fluid) also contained in the strut assembly 100.

One end of the piston 104 is pivotably attached to a carriage for a ground-engaging member, for example a trailing arm assembly 110 having a trailing arm body 111 with a first mounting portion 113 for rotatably mounting an axle 114 supporting a plurality of wheels 90. The trailing arm body 111 further includes a second mounting portion 115 with a pivot pin 116 for attaching the trailing arm assembly 110 to the vehicle (not shown). The pivot pin 116 may be attached directly to the vehicle, or may be attached to the vehicle with one or more intermediate members, either rigid or collapsible (not shown). In some embodiments one or more articulated struts may be provided with conventional actuators and control systems to move the shock strut between a stowed position and a released position.

A torsion link assembly 120 includes a lower torsion link 122 pivotably attached to an upper torsion link 124. The lower torsion link 122 and the piston 104 are connected to the trailing arm body 111 with a first pivot pin 121. The upper torsion link 124 is pivotably connected to a clevis fork 108 on a lower end of the cylinder 106 with a second pivot pin 123. The torsion link assembly 120, therefore, is configured to accommodate axial motion between the piston 104 and the cylinder 106, and to react rotational or torsional forces from the cylinder 106. As discussed below, in the shock strut assembly 100 torsional forces or moments are imparted to the cylinder 106 by the relative motion of a geared nut 140 having an interior thread 147 that threadably engages the cylinder 106.

A housing assembly 130 defines a central through channel 131 having a diameter or transverse dimension that is larger than the diameter of at least an upper portion of the cylinder 106. The cylinder 106 extends through the through channel 131. Oppositely disposed attachment members, e.g., trunnion pins 132 on housing assembly 130 are configured for attaching the housing assembly 130 to the vehicle. A housing retainer nut 139 is installed near a lower end of the housing assembly 130. A motor mount 134 is attached to, or co-formed with the housing assembly 130, and is configured for fixing a motor 150 to the shock strut assembly 100.

The motor 150 may be an electric motor. In a current embodiment the motor 150 is a brushless DC motor. In an embodiment the motor 150 is a stepper motor, as are well-known in the art. Power and control connection members 152, for example wires, wireless receivers, fluid conduits, or the like, provide energy and control signals to the motor 150. Although an electric motor is currently preferred, other types of motors are known in the art and may alternatively be used and may be preferable in particular applications. For example the motor 150 may be a hydraulic motor, for example. In another embodiment the motor 150 is a hydraulic rotary motor.

Figure 2:
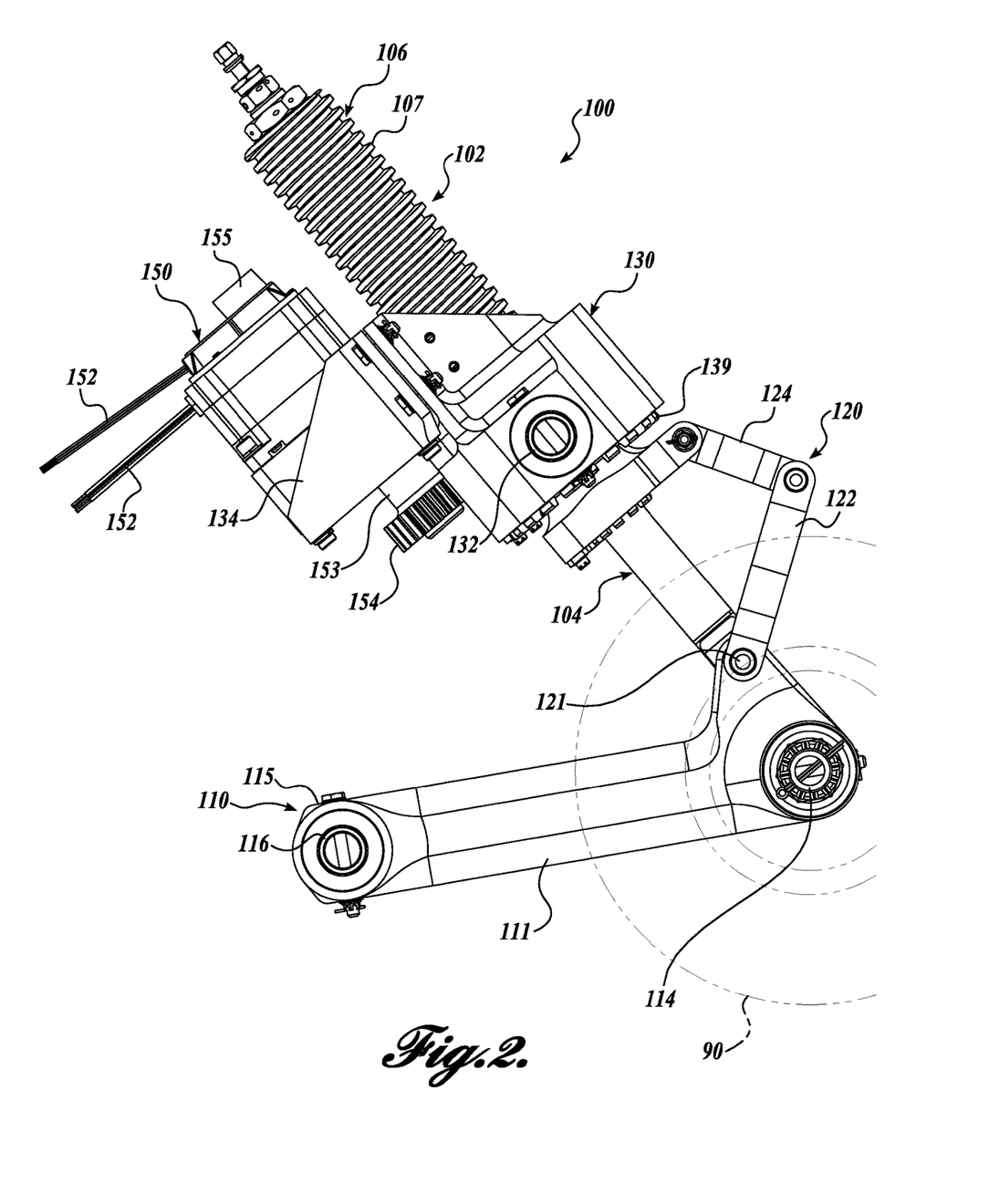
FIG. 2 is a side view of the deployable shock strut assembly shown in FIG. 1.
Figure 3:
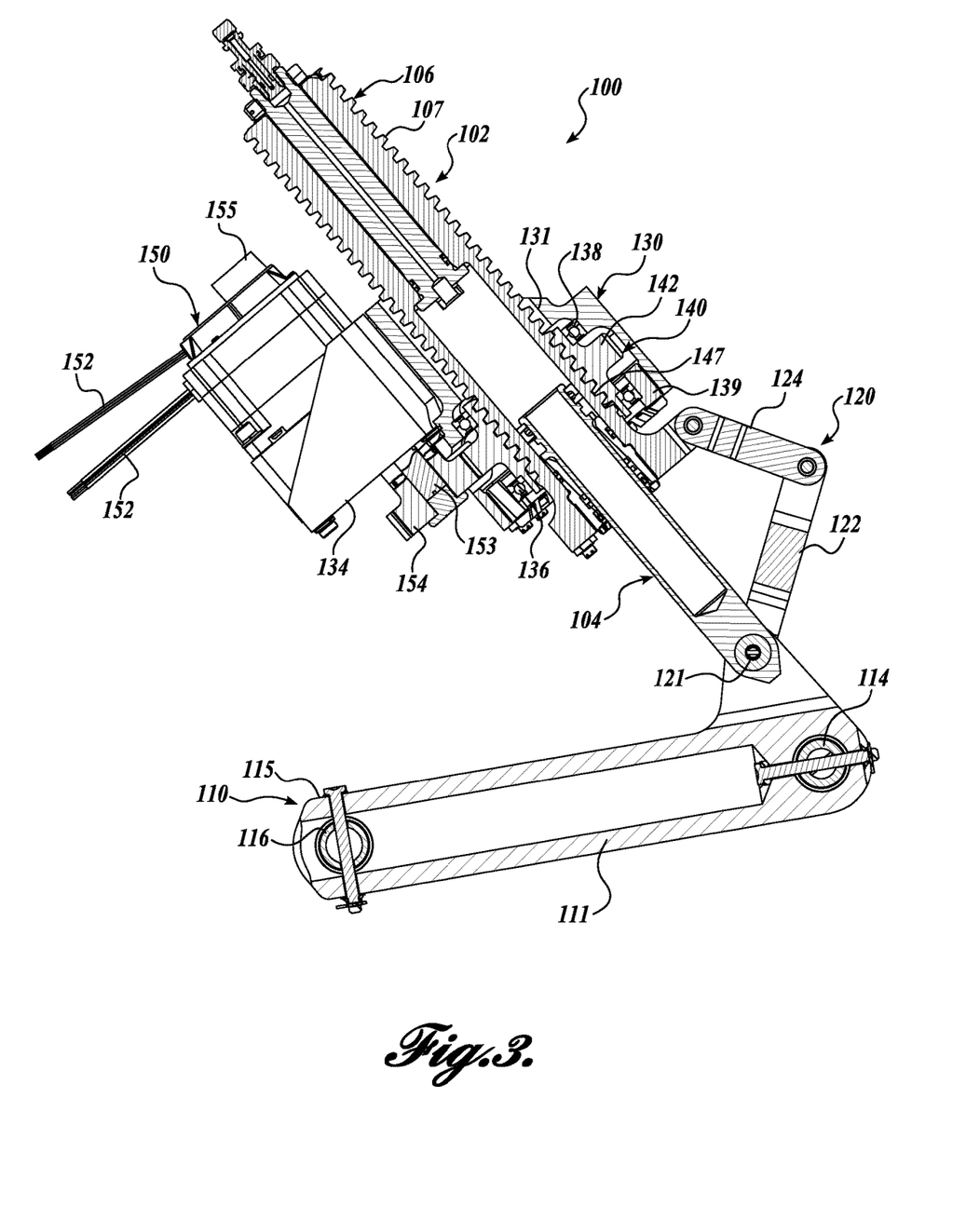
FIG. 3 is a sectional view of the deployable shock strut assembly shown in FIG. 1.

Refer now also to the side view of the strut assembly 100 shown in FIG. 2 and a corresponding sectional view of the strut assembly 100 shown in FIG. 3. The motor-driven shaft 153 extends below the motor 150, and is configured with a drive gear or pinion gear 154 fixed to the motor-driven shaft 153.

The outer portion of the cylinder 106 defines a screw threaded 107. For example, the cylinder 106 in a current embodiment has a trapezoidal thread 107. A common trapezoidal thread form is the so-called Acme thread that is frequently used for lead screws, and has a 29° thread angle with a thread height half of the pitch. The thread crest and valley are flat, producing a trapezoidal thread shape. Other thread forms may alternatively be used, including other trapezoidal thread forms, as are known in the art. Although in the currently preferred embodiment the thread 107 is formed or produced integrally with the cylinder 106, other constructions are contemplated. For example, in another embodiment a separate threaded tube may be formed with a lead screw thread 107, and a conventional shock absorber cylinder inserted and fixed to the threaded tube.

As seen most clearly in FIG. 3, a geared nut 140 having an interior thread 147 threadably engages the cylinder 106 having an external thread 107. The perimeter of the geared nut 140 comprises a cogwheel or gear portion 142 that is configured and positioned to engage the pinion drive gear 154 driven by the motor 150. The geared nut 140 is rotatably supported in the housing assembly 130. In a current embodiment, a lower bearing assembly 136 is supported in the housing assembly 130 by the housing retainer nut 139, and engages a lower portion of the geared nut 140. An upper bearing assembly 138 is supported in the housing 130, and engages an upper portion of the geared nut 140. The upper and lower bearing assemblies 136, 138 in this embodiment are single row deep groove ball bearings. Other bearing configurations may be used, and are known in the art. For example, the upper and lower bearing assemblies may each comprises a thrust bearing assembly and a radial bearing. The bearing assemblies 136, 138 allow radial motion while absorbing thrust forces, for example those encountered during landings, including those due to rebounds and uneven ground features.

As discussed above, the housing assembly 130 may be attached to the vehicle through the trunnion pins 132. The pinion gear 154 engages the outer gear portion 142 of the geared nut 140. Therefore, the motor 150 rotatably drives the geared nut 140, causing the cylinder 106 to move axially between a retracted position and an extended position.

Figure 4A:
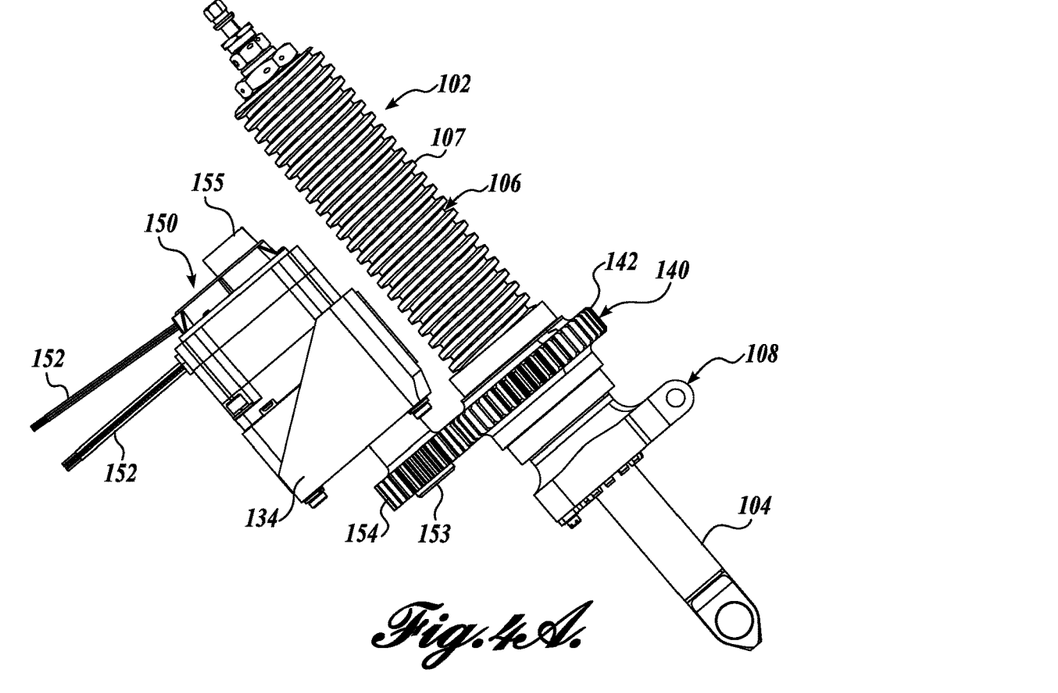
FIG. 4A shows the motor, geared nut, and the shock absorber of the deployable shock strut assembly shown in FIG. 1, with the strut in a retracted position.
Figure 4B:
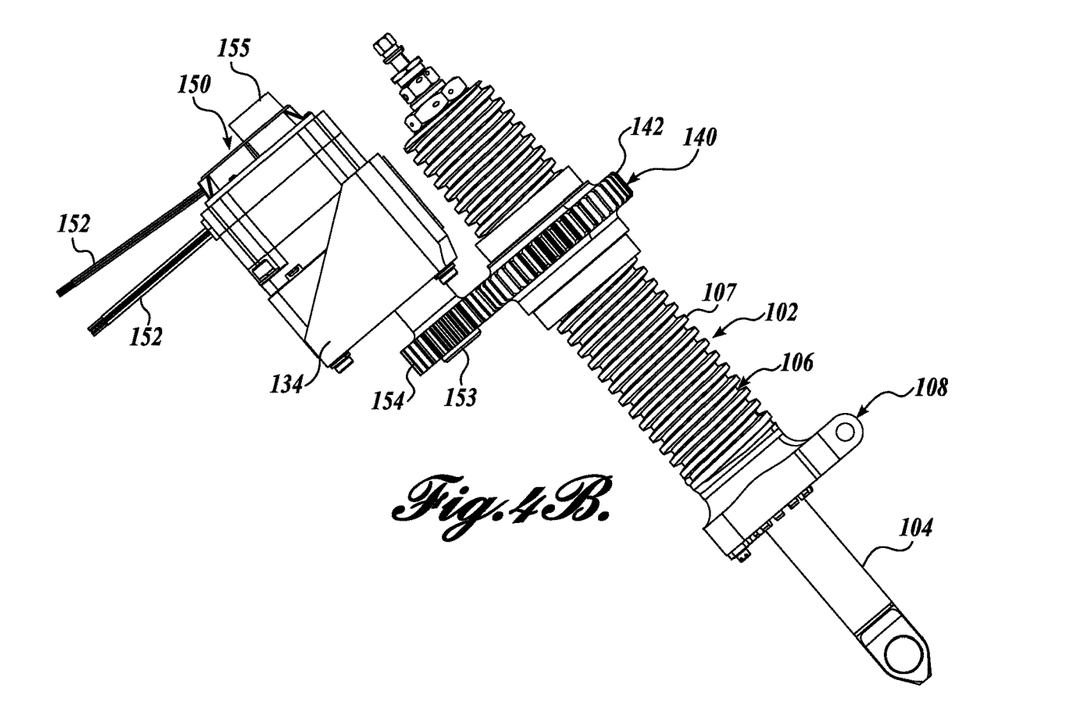
FIG. 4B shows the motor, geared nut, and the shock absorber of the deployable shock strut assembly shown in FIG. 1, with the strut in an extended position.

FIG. 4A shows the motor 150, the geared nut 140, and the shock absorber 102 (piston 104 and cylinder 106), with the strut in a retracted position. FIG. 4B shows the strut moved by the motor 150 to an extended position. Because the shock strut 100 is connected to the vehicle through the housing assembly 130 and through the trailing arm assembly 110, the effective length of the shock strut 100 depends on the location of the geared nut 140 along the cylinder 106. The effective length of the shock strut 100 is shorter when the gear nut 140 is near a lower end of the cylinder 106, and is longer when the gear nut 140 is near an upper end of the cylinder 106. However, in any position the shock strut 100 maintains the same shock absorbing characteristics of the shock absorber 102, because the relative positions of the piston 104 and cylinder 106 of the shock absorber 102 does not change. As will be appreciated by persons of skill in the art, while the relative position of the shock absorber 102 does not affect the shock strut 100 performance or characteristics, the mechanical advantage of the shock strut 100 will vary as its relationship to the trailing arm pivot pin 116 and trailing arm 110 varies. The mechanical advantage determines the amount of load imparted to the shock strut 100 as a ratio of vertical and horizontal wheel loads.

The shock strut 100 provides many advantages over prior art systems. For example, the shock strut 100 provides a compact and integrated extension, retraction, and shock absorbing system that shortens the effective length of the shock strut 100 without compressing the telescoping the shock absorber 102. The extension and retraction mechanism may be fully electric, with the use of an electric motor 150, and the amount of extension or retraction is controllable, and may be selected or adjusted on the fly. The shock strut 100 may include one or more conventional sensors 155, as are known in the art. For example, a motor turn count sensor 155 may be provided, wherein the effective length of the shock strut 100 may be determined by maintaining a count of the number of rotations of the geared nut, pinion gear, or motor. Alternatively, a sensor may be configured to identify which thread 107 turn(s) engage the geared nut 140 (or is adjacent a known location on the housing) for example. The sensor 155 may also or alternatively be configured to receive control signals for example an operator input for deploying or retracting the shock strut 100, and to provide corresponding control signals to the motor 150. Other advantages of the shock strut 100 over prior art systems that shorten the shock absorber (e.g., by compressing the piston into the cylinder) are a simpler system, increased fatigue life, and safety. In particular, since the shock strut is not forced into a compressed state, for example by a linkage shortening mechanism, the stresses or pressures associated with compressing, and maintaining the shock absorber in a compressed state, are avoided.

The shock strut allows for active length adjustment while the vehicle is resting or moving with weight on the shock strut 100. Although one shock strut 100 is illustrated, it will be appreciated that two or more shock struts 100 may typically be provided and arranged on opposite sides of the vehicle center-plane. For example, the shock strut may be used to provide a "kneeling function" i.e., to selectively lower the vehicle (e.g., the nose of an aircraft, or one side of a vehicle to facilitate loading, or boarding and disembarking from the vehicle. Similarly a left side shock strut 100 may be extended to a different effective length than a right side shock strut 100, for example to level the vehicle on uneven terrain.

It is contemplated that the shock strut 100 may be further provided with a conventional articulated strut actuator mechanism, for example to pivot the entire shock strut 100 into a stowage compartment, as are well-known in the art.

While illustrative embodiments have been illustrated and described, it will be appreciated that various changes can be made therein without departing from the spirit and scope of the invention.

The embodiments of the invention in which an exclusive property or privilege is claimed are defined as follows:

1. A shock absorbing strut for a vehicle comprising:
   a housing defining a through channel and including a motor mount, wherein the housing is configured to be pivotably mounted to the vehicle;
   a motor fixed to the motor mount and configured to controllably drive a shaft and a pinion gear mounted on the shaft;
   a shock absorber comprising a piston pivotably connected to a ground engaging assembly, and a cylinder that slidably receives the piston, wherein an outer surface of the cylinder comprises a screw thread, and further wherein the cylinder extends through the housing through channel;
   a geared nut having a central aperture that threadably engages the cylinder screw thread and a peripheral gear portion that is driveably engaged by the pinion gear; and
   upper and lower bearing assemblies rotatably supporting the geared nut in the housing;
   wherein the motor is configured to rotate the geared nut in the housing such that the cylinder moves axially.

2. The shock absorbing strut of claim 1, wherein the housing is pivotably mounted to the vehicle with a pair of oppositely disposed trunnion pins.

3. The shock absorbing strut of claim 1, wherein the motor is an electric motor, and further comprises a connection member for receiving and transmitting control signals to and from the motor.

4. The shock absorbing strut of claim 3, wherein the electric motor comprises a brushless DC motor.

5. The shock absorbing strut of claim 3, further comprising a sensor configured to detect an extension position of the strut, and to provide sensor data to a controller.

6. The shock absorbing strut of claim 5, wherein the sensor is configured to monitor the net number of rotations of the geared nut.

7. The shock absorbing strut of claim 1, wherein the ground engaging assembly comprises a trailing arm assembly having a first mounting portion that pivotably connects to the piston, and a second mounting portion comprising a pivot pin spaced apart from the first mounting portion.

8. The shock absorbing strut of claim 7, wherein the ground engaging assembly further comprises an axle rotatably mounted in the trailing arm assembly, and a plurality of wheels mounted on the axle.

9. The shock absorbing strut of claim 7, further comprising a torsion link assembly connecting the piston to the cylinder such that the piston can move axially with respect to the cylinder but is prevented from moving rotationally with respect to the cylinder.

10. The shock absorbing strut of claim 1, wherein the shock absorbing strut comprises a portion of a landing gear for an aircraft.

11. The shock absorbing strut of claim 1 wherein the screw thread is a trapezoidal thread.

12. The shock absorbing strut of claim 1, wherein the first and second bearing assemblies comprise single row deep groove ball bearings.

13. A method of extending and retracting a shock absorbing strut mounted to a vehicle, wherein the shock absorbing strut comprises:
 a housing defining a through channel and including a motor mount attached to the vehicle;
 a shock absorber comprising a piston pivotably connected to a ground engaging assembly, and a cylinder that slidably receives the piston, an outer surface of the cylinder having a screw thread, wherein the cylinder extends through the housing through channel;
 a geared nut having a central aperture that threadably engages the cylinder screw thread and a peripheral gear portion;
 a motor fixed to the motor mount and configured to drive a pinion gear that engages the peripheral gear portion of the geared nut;

the method comprising:
 sensing the location of the cylinder within respect to the housing; and
 using the motor and the sensed location data to controllably drive the pinion gear such that the geared nut rotates about the cylinder to cause the shock absorber to moves axially with respect to the geared nut.

14. The method of claim 13, wherein the housing is pivotably mounted to the vehicle with a pair of oppositely disposed trunnion pins.

15. The method of claim 13, wherein the motor is an electric motor, and further comprises a connection member for receiving and transmitting control signals to and from the motor.

16. The method of claim 13, wherein the ground engaging assembly comprises a trailing arm assembly having a first mounting portion that pivotably connects to the piston, and a second mounting portion comprising a pivot pin spaced apart from the first mounting portion.

17. The method of claim 16, wherein the ground engaging assembly further comprises an axle rotatably mounted in the trailing arm assembly, and a plurality of wheels mounted on the axle.

18. The method of claim 16, further comprising a torsion link assembly connecting the piston to the cylinder such that the piston can move axially with respect to the cylinder but is prevented from moving rotationally with respect to the cylinder.

19. The method of claim 13, wherein the shock absorbing strut comprises a portion of a landing gear for an aircraft.

20. The method of claim 13 wherein the screw thread is a trapezoidal thread.

* * * * *

UNITED STATES PATENT AND TRADEMARK OFFICE
CERTIFICATE OF CORRECTION

PATENT NO. : 10,549,848 B2
APPLICATION NO. : 15/498028
DATED : February 4, 2020
INVENTOR(S) : G. Klim et al.

Page 1 of 1

It is certified that error appears in the above-identified patent and that said Letters Patent is hereby corrected as shown below:

In the Claims

| Column | Line | |
|---|---|---|
| 8 | 7 | change "to moves axially" to -- to move axially -- |

Signed and Sealed this
Eighth Day of November, 2022

Katherine Kelly Vidal
*Director of the United States Patent and Trademark Office*